(12) United States Patent
Saieg et al.

(10) Patent No.: US 7,690,664 B2
(45) Date of Patent: Apr. 6, 2010

(54) PNEUMATIC SLIDER SUSPENSION LOCKING PIN SYSTEM

(75) Inventors: Steven G. Saieg, Rochester Hills, MI (US); Braden J. Bromley, Royal Oak, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 23 days.

(21) Appl. No.: 11/651,351

(22) Filed: Jan. 9, 2007

(65) Prior Publication Data

US 2008/0164671 A1 Jul. 10, 2008

(51) Int. Cl.
*B62D 53/06* (2006.01)
(52) U.S. Cl. .................................. 280/149.2
(58) Field of Classification Search ............... 180/209; 280/407.1, 149, 149.2, 405.1
See application file for complete search history.

(56) References Cited

U.S. PATENT DOCUMENTS

| | | | |
|---|---|---|---|
| 2,935,332 A | 5/1960 | Delay | |
| 3,087,741 A | 4/1963 | Delay | |
| 3,379,453 A | 4/1968 | Fujioka | |
| 3,618,969 A | 11/1971 | Glassmeyer | |
| 3,778,079 A | 12/1973 | Vornberger et al. | |
| 4,132,326 A * | 1/1979 | Pinto | 414/536 |
| 4,673,191 A | 6/1987 | Arguin | |
| 4,777,810 A | 10/1988 | Webster | |
| 4,838,566 A * | 6/1989 | Baxter et al. | 280/149.2 |
| 4,838,578 A * | 6/1989 | Baxter | 280/149.2 |
| 4,955,629 A | 9/1990 | Todd, Jr. et al. | |
| 5,199,732 A * | 4/1993 | Lands et al. | 280/407.1 |
| 5,346,233 A | 9/1994 | Moser | |
| 5,460,237 A | 10/1995 | Schueman | |
| 5,462,301 A | 10/1995 | Schueman | |
| 5,465,990 A * | 11/1995 | Wessels | 280/407.1 |
| 5,474,149 A | 12/1995 | Schueman | |
| 5,480,171 A | 1/1996 | Cheffey | |
| 5,507,511 A | 4/1996 | Schueman | |
| 5,564,725 A * | 10/1996 | Brazeal | 280/149.2 |
| 5,564,727 A | 10/1996 | Wessels | |
| 5,620,195 A | 4/1997 | Wessels | |
| 5,642,896 A | 7/1997 | Pierce et al. | |
| 5,758,890 A | 6/1998 | Wessels | |
| 5,813,682 A | 9/1998 | Stevens | |
| 6,122,946 A | 9/2000 | Blanch | |
| 6,279,933 B1 * | 8/2001 | Ross et al. | 280/149.2 |
| 6,435,536 B2 | 8/2002 | Eckelberry | |

(Continued)

OTHER PUBLICATIONS

European Search Report Dated Mar. 18, 2008.

*Primary Examiner*—Faye M. Fleming
(74) *Attorney, Agent, or Firm*—Carlson, Gaskey & Olds

(57) ABSTRACT

A trailer slider system includes a body rail that slides longitudinally relative to a suspension frame side rail. One of the rails includes holes that provide multiple suspension positions. The trailer slider system also includes a pin connection assembly having a pin that is arranged to extend into one of the holes in a locked position and retract out of the hole in an unlocked position. A cam is coupled for movement with the pin connection assembly. A tube is coupled with the cam to rotate as the pin moves between the locked and unlocked positions. A pneumatic actuator is coupled with the tube for selectively rotating the tube to move the cam which in turn moves the pin, between the locked and unlocked positions.

20 Claims, 6 Drawing Sheets

U.S. PATENT DOCUMENTS

| | | |
|---|---|---|
| 6,471,227 B2 | 10/2002 | Eckelberry et al. |
| 6,485,054 B1 | 11/2002 | Yurgevich |
| 6,488,303 B1 | 12/2002 | Cobb |
| 6,641,157 B2 | 11/2003 | Eckelberry et al. |
| 6,702,310 B2 * | 3/2004 | Browning ............... 280/149.2 |
| 6,921,100 B2 | 7/2005 | Mantini et al. |
| 7,097,192 B2 | 8/2006 | Saieg |
| 7,163,220 B2 * | 1/2007 | Pappas ................. 280/149.2 |
| 7,188,684 B2 | 3/2007 | Nolan |
| 7,261,177 B2 * | 8/2007 | Eckelberry ............. 180/209 |
| 2005/0173885 A1 | 8/2005 | Eckelberry |
| 2006/0267306 A1 | 11/2006 | Saieg et al. |
| 2006/0267307 A1 | 11/2006 | Saieg et al. |

* cited by examiner

PNEUMATIC SLIDER SUSPENSION LOCKING PIN SYSTEM

BACKGROUND OF THE INVENTION

This disclosure generally relates to a locking mechanism for a slider suspension. Sliding suspensions are used to reposition wheels relative to a frame to redistribute axle loads as needed. These sliding suspensions include a locking system that locks the sliding suspension in a desired position relative to the frame. The locking system includes a series of pins that are received in openings formed within the frame to lock the sliding suspension to the frame. To adjust the position of the sliding suspension, the pins are unlocked from the frame and a vehicle then moves the frame relative to the sliding suspension into a desired position. The pins are then again locked to the frame.

One disadvantage with current systems is that pins may become stuck in an extended position, which significantly increases the effort required to make an adjustment. Or, the vehicle could be driven without the pins being fully engaged to the frame. This could cause the sliding suspension to collide with the frame resulting in damage to suspension components.

Another challenge with the use of a slider suspension is to ensure the locking pins are engaged in the holes before the tractor begins to pull the trailer. If the locking pins are not fully engaged, then it is possible for the slider to move relative to the trailer, such as under hard braking or high acceleration. For example, if hard braking occurs when the pins are not fully engaged, the pins may jump past body rail holes as the trailer body rails move forward relative to the trailer suspension frame causing the sliding suspension to collide with the frame resulting in damage to suspension components.

Thus, it would be beneficial to have a locking system with independent pin extension which cooperates with a brake system component to ensure that the locking pins are spring biased towards engagement, and a pin design that avoids jumping past the trailer body rail holes.

SUMMARY OF THE INVENTION

An example trailer slider system includes a body rail that slides longitudinally relative to a suspension frame side rail. One of the rails includes holes that provide multiple suspension positions. The trailer slider system also includes a pin connection assembly having a pin that is arranged to extend into one of the holes in a locked position and retract out of the hole in an unlocked position. A cam is coupled for movement with the pin connection assembly. A tube is coupled with the cam to rotate as the pin moves between the locked and unlocked positions. A pneumatic actuator is coupled with the tube for selectively rotating the tube to move the cam which in turn moves the pin, between the locked and unlocked positions.

These and other features of the present invention can be best understood from the following specification and drawings, the following of which is a brief description.

DETAILED DESCRIPTION OF THE PREFERRED EMBODIMENT

Figure 1:
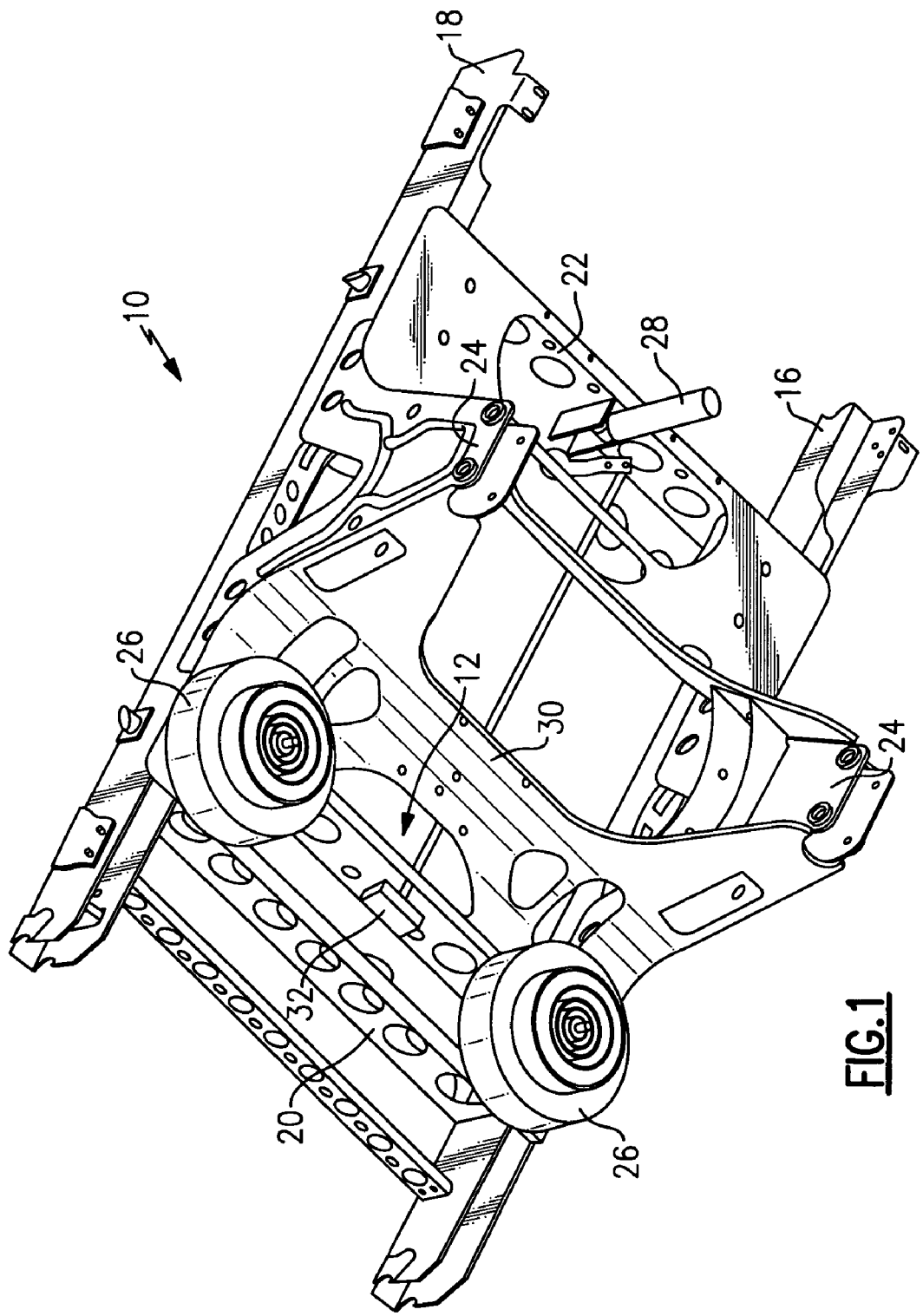
FIG. 1 is a bottom perspective view of a suspension slider incorporating one example configuration of a locking mechanism.

FIG. 1 is a bottom perspective view of an example trailer slider system 10 incorporating one example configuration of a locking mechanism 12. The trailer slider system 10 is used to reposition wheels relative to a trailer support structure, associated with a trailer that is pulled by a vehicle (not shown) to redistribute axle loads as needed. The trailer slider system 10 includes the locking mechanism 12 that locks the trailer slider system 10 in a desired position relative to the trailer support structure. Trailer support structures are well known and any type of trailer support structure can be used with the trailer slider system 10.

Figure 2:
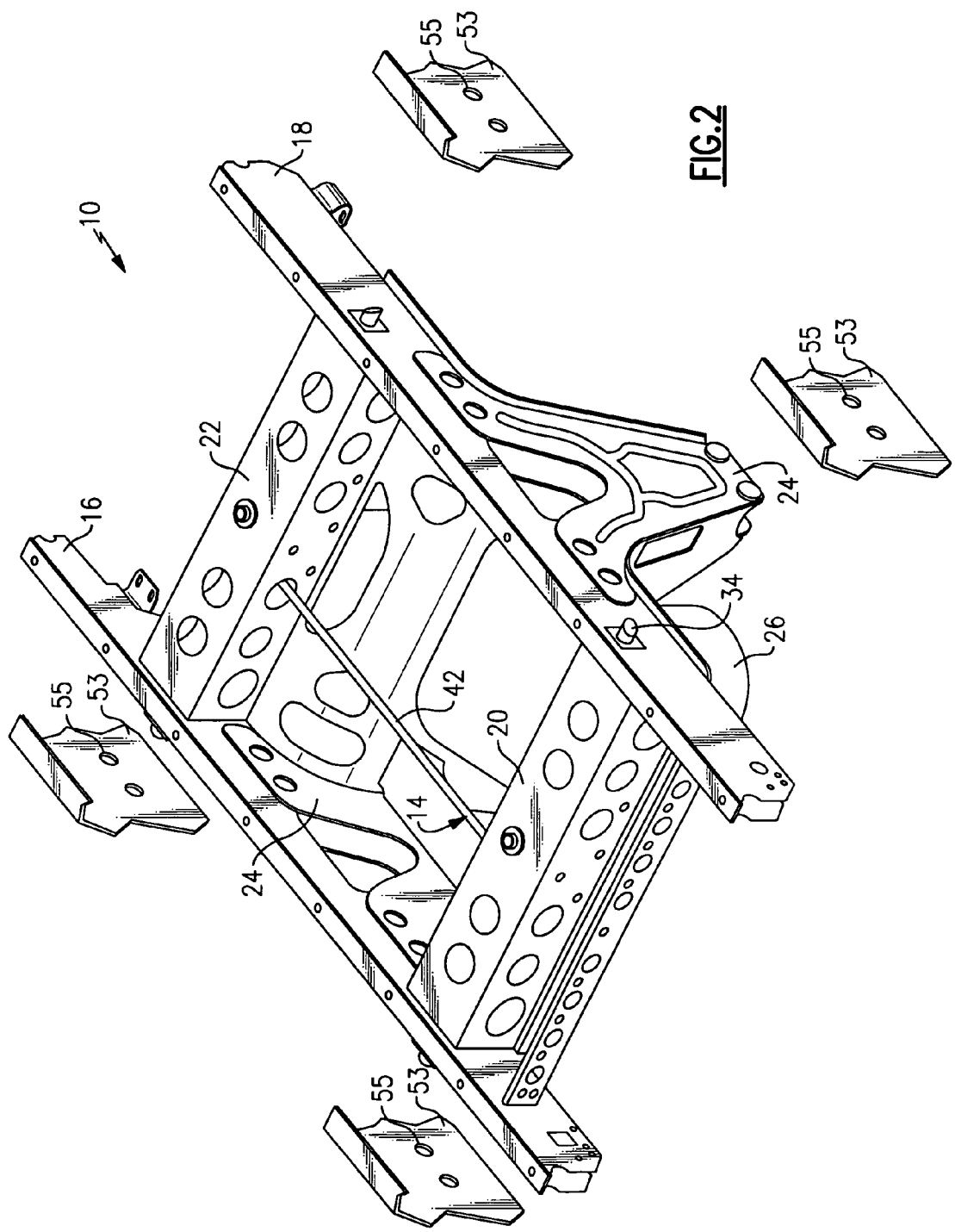
FIG. 2 is a top view of the suspension slider of FIG. 1.

In the example shown in FIGS. 1-2, the trailer slider system 10 includes first 16 and second 18 longitudinal members that are laterally spaced apart from each other, and first 20 and second 22 cross-members that extend between the first 16 and second 18 longitudinal members. The first 20 and second 22 cross-members are longitudinally spaced apart from each other.

Hanger brackets 24 extend from the first 16 and second 18 longitudinal members to support suspension components (not shown) as known. The suspension components are associated with axles (not shown) also as known, with spring elements 26 (FIG. 1) being positioned between the trailer slider system 10 and the axles. A single shock absorber 28 is positioned between each axle and a respective one of the first 20 and second 22 cross-members. A belly pan 30 (best seen in FIG. 1) is connected to the first 16 and second 18 longitudinal members, the first 20 and second 22 cross-members, and to the hanger brackets 24 to provide increased structural rigidity for the trailer slider system 10.

The locking mechanism 12 is actuated by a pneumatic actuator 32 (shown schematically in FIG. 3) that moves the locking mechanism 12 between a locked or extended position where the trailer slider system 10 is locked to a trailer support structure, and an unlocked or retracted position where a vehicle can move the trailer support structure relative to the trailer slider system 10 to reposition axle loads as needed.

Figure 3:
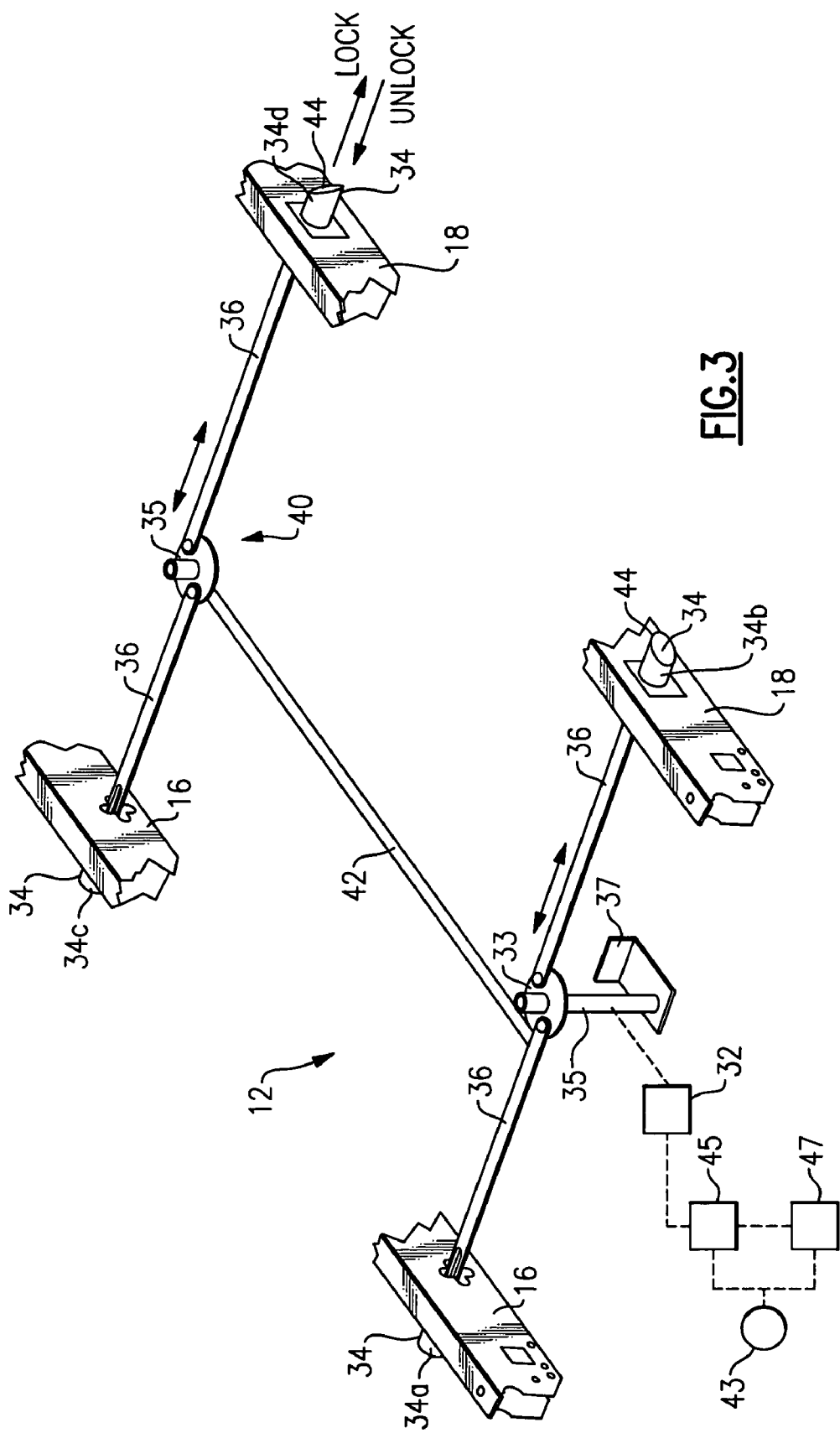
FIG. 3 is a perspective view of the locking mechanism of FIG. 1.

An example of the locking mechanism 12 is shown in FIG. 3. The locking mechanism 12 includes a plurality of pins 34 that extend through the first 16 and second 18 longitudinal members to lock into the trailer support structure when moved into the locked position. In the example shown, the plurality of pins 34 includes a front set of laterally spaced pins 34a, 34b and a rear set of laterally spaced pins 34c, 34d. Pins 34a and 34c are associated with the first longitudinal member 16 and pins 34b, 34d are associated with the second longitudinal member 18.

Each pin 34*a*, 34*b*, 34*c*, 34*d* is associated with a pin connection link 36. Each pin connection link 36 is associated with an actuator for the locking mechanism 12. In the example shown, the pneumatic actuator 32 is coupled with a tube 35 supported on a bracket 37, as will be described below. The pneumatic actuator 32 is used to control movement of the front set of pins 34*a*, 34*b* through a front cam 33 and a secondary actuator 40 is used to control movement of the rear set of pins 34*c*, 34*d* through a rear cam 35. The front cam 33 actuates the rear cam 35 via a fore-aft link 42 that extends longitudinally relative to the trailer slider system 10. The fore-aft link 42 acts in tension and thus can comprise a cable, or a rigid rod or tube.

It should be understood that while the pneumatic actuator 32 is shown as being associated with the front cam 33 pins, the positions of the pneumatic actuator 32 and the secondary actuator 40 could be reversed such that the pneumatic actuator 32 is associated with the rear cam 35. Also, while both front and rear sets of pins 34*a*, 34*b*, 34*c*, 34*d* are shown, the locking mechanism 12 could also be used with only one set of pins or with a greater number of pins, depending upon the suspension configuration. In another contemplated configuration, the pneumatic actuator 32 could be used in a central configuration with the pneumatic actuator 32 acting on the fore-aft link 42 with secondary actuating mechanisms similar to secondary actuator 40 being associated with each set of laterally spaced pins 34*a*, 34*b*, 34*c*, 34*d*.

As shown schematically, the pneumatic actuator 32 is fluidly coupled with a pressurized gas supply 43, such as an air tank. A control valve 45 is located between the pressurized gas supply 43 and the pneumatic actuator 32. For example, the control valve 45 includes a manually operative pushbutton valve to selectively deliver pressurized gas to the pneumatic actuator 32 to lock or unlock the pins 34. A parking brake system 47 is also fluidly connected with the pressurized gas supply 43, the details of which will be described below.

Additionally, in the example shown, each of the plurality of pins 34 is configured with a tip 44 that extends through a corresponding hole 55 (FIG. 2) of a body rail 53 (shown in partial in FIG. 2) to provide better pin engagement in the locked position.

Figure 4:
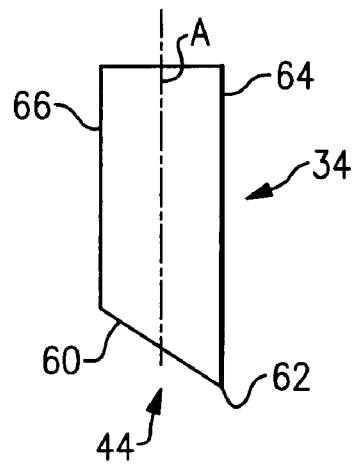
FIG. 4 is a schematic view of a first example pin for use in the locking mechanism of FIG. 1.
Figure 5:
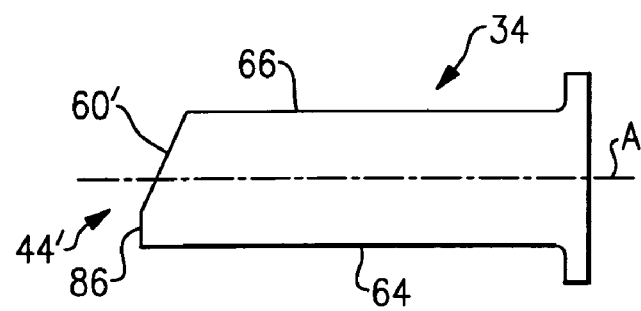
FIG. 5 is a schematic view of a second example pin for use in the locking mechanism of FIG. 1.
Figure 6:
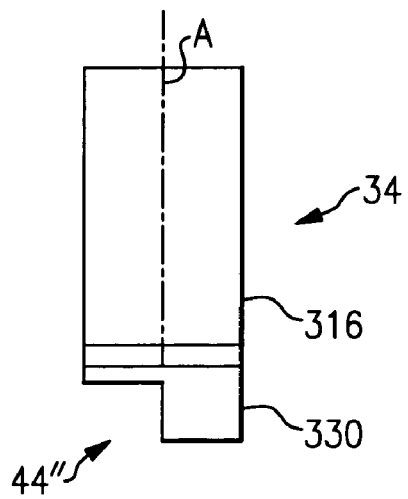
FIG. 6 is a schematic view of a third example pin for use in the locking mechanism of FIG. 1.

FIGS. 4-6 illustrate different examples of the pins 34. In the embodiment shown in FIG. 4, the pin 34 includes a periphery, which in one example is a cylindrical surface, having opposing sides 64, 66. The periphery is spaced axially from the apex 62 in the example shown, a ramped surface 60 extends from the apex 62, which lies along long side 64, to a short side 66 opposite the long side 64. In the example shown, the ramped surface 60 is a generally planar surface and the apex 62 is offset from a centerline axis A of the pin 34. The ramped surface 60 enables the pin 34 to extend through the hole 55 in the body rail 53 prior to the centerline axis A of the pin 34 and a centerline of the hole 55 being substantially aligned. Thus, the body rail 53 is prevented from moving relative to the longitudinal members 16, 18 when the pins 34 are misaligned with the holes 55.

In the embodiment shown in FIG. 5, the ramped surface 60' of the tip 44' of the pin 34 is truncated to create an apex face 86. The area of the apex face 86 is controlled by the amount of the ramped surface truncation and the angle of the ramped surface 60'. As described above, the ramped surface 60' enables the pin 34 to extend through the hole 55 in the body rail 53 prior to the centerline axis A of the pin 34 and a centerline of the hole 55 being substantially aligned.

In the embodiment shown in FIG. 6, the tip 44' provides a stepped profile having a reduced area extension portion 330 extending outwardly from one edge 316 of the pin 34. The extension portion 330 enables the pin 34 to extend through the hole 55 in the body rail 53 prior to the centerline axis A of the pin 34 and a centerline of the hole 55 being substantially aligned, as described above.

Additional non-limiting examples of pins 34 and tips 44 are set forth in application Ser. No. 11/248,038 filed on Oct. 12, 2005, which is owned by the assignee of the present invention.

Figure 7:
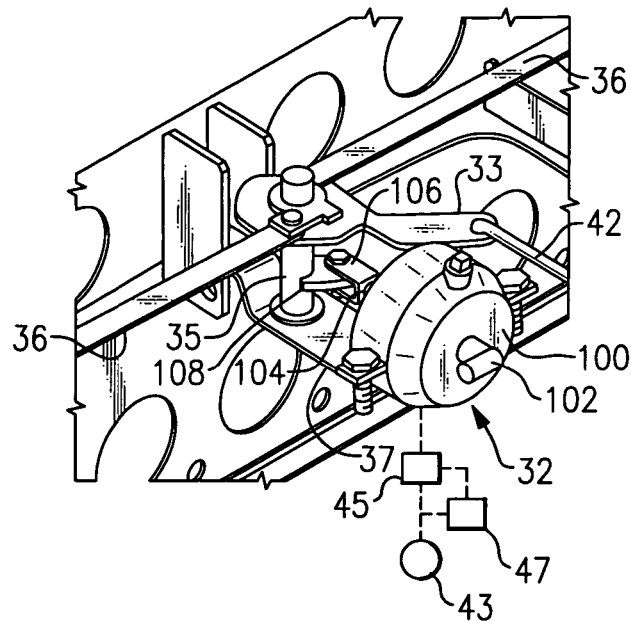
FIG. 7 is a perspective view of an example pneumatic actuator for use with the locking mechanism of FIG. 1.

The pneumatic actuator 32 is shown in greater detail in FIG. 7. The pneumatic actuator 32 includes a chamber 100 having a port 102 fluidly connected with the control valve 45 as described in FIG. 3. A rod 104 extends from the chamber 100, and translates axially depending on whether the chamber 100 is pressurized with a gas flow. A clevis and pin arrangement 106 on a distal end of the rod 104 pivotally connects the rod 104 with a lever 108, which is fixed to the tube 35 by a welded connection, for example. The front cam 33 is fixed to the tube 35 and to two of the connection links 36.

Figure 8:
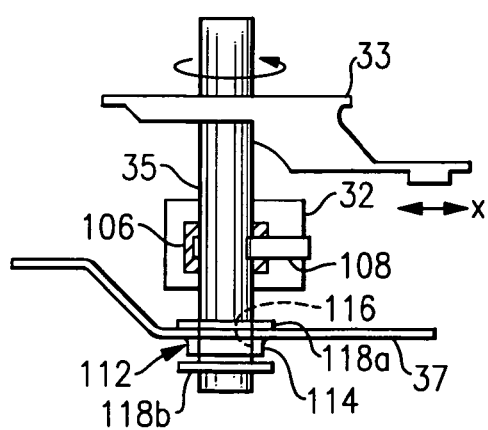
FIG. 8 is a schematic view of a connection between the pneumatic actuator and a cam, a tube, and a clevis and pin arrangement.
Figure 9:
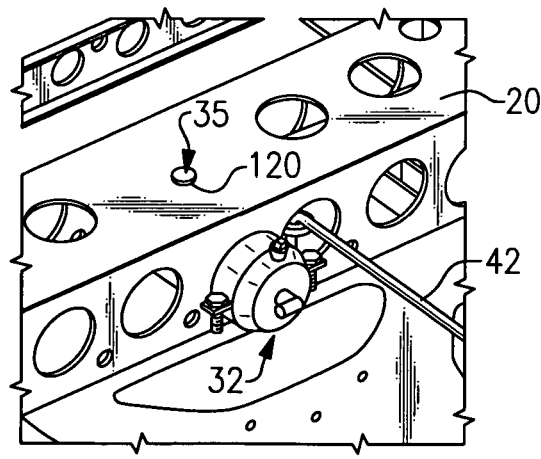
FIG. 9 is a perspective view of the pneumatic actuator mounted to a trailer suspension cross member.

The tube 35 is rotatably supported between the bracket 37 as illustrated in FIG. 8 and cross member 20 as illustrated in FIG. 9. Referring to FIG. 8, the bracket 37 includes a bearing section 112 that includes a cylindrical wall 114 having an opening 116 there through. The cylindrical wall 114 limits movement of the tube 35 in an X-direction and permits rotation of the tube 35 along a longitudinal axis of the tube 35. A pair of washers 118*a*, 118*b* are fixed to the tube 35 on respective opposing sides of the bracket 37 to limit axial movement of the tube 35.

Referring to FIG. 9, the other end of the tube 35 extends through a hole 120 in the cross member 20. The hole 120 is slightly larger in diameter than the tube 35 to permit the tube 35 to rotate about the longitudinal axis of the tube 35. The cross member 20 also includes a bearing section, similar to the bearing section 112 of the bracket 37, that likewise limits movement of the tube 35 in the X-direction and permits rotation of the tube 35 along the longitudinal axis of the tube 35.

The pneumatic actuator 32 selectively moves the rod 104 to move the pins 34 that are associated with the connection links 36. Movement of the rod 104 causes movement of the clevis and pin arrangement 106, which rotates the lever 108. Rotation of the lever 108 causes rotation of the tube 35, which in turn rotates the cam 110 to move the connection links 36 and corresponding pins 34.

The control valve 45 controls an air flow supply to the pneumatic actuator 32 from the pressurized gas supply 43. In an exhaust position, the control valve 45 vents to the surrounding atmosphere such that no air flow is provided to the pneumatic actuator 32. The exhaust position corresponds to the pins 34 being in the locked position. That is, the pneumatic actuator 32 is biased in a known manner to extend the pins 34 into the locked position when there is no air flow provided. In a supply position, the control valve 45 permits air flow to the pneumatic actuator 32 to move the pins 34 into the unlocked position.

Figure 10:
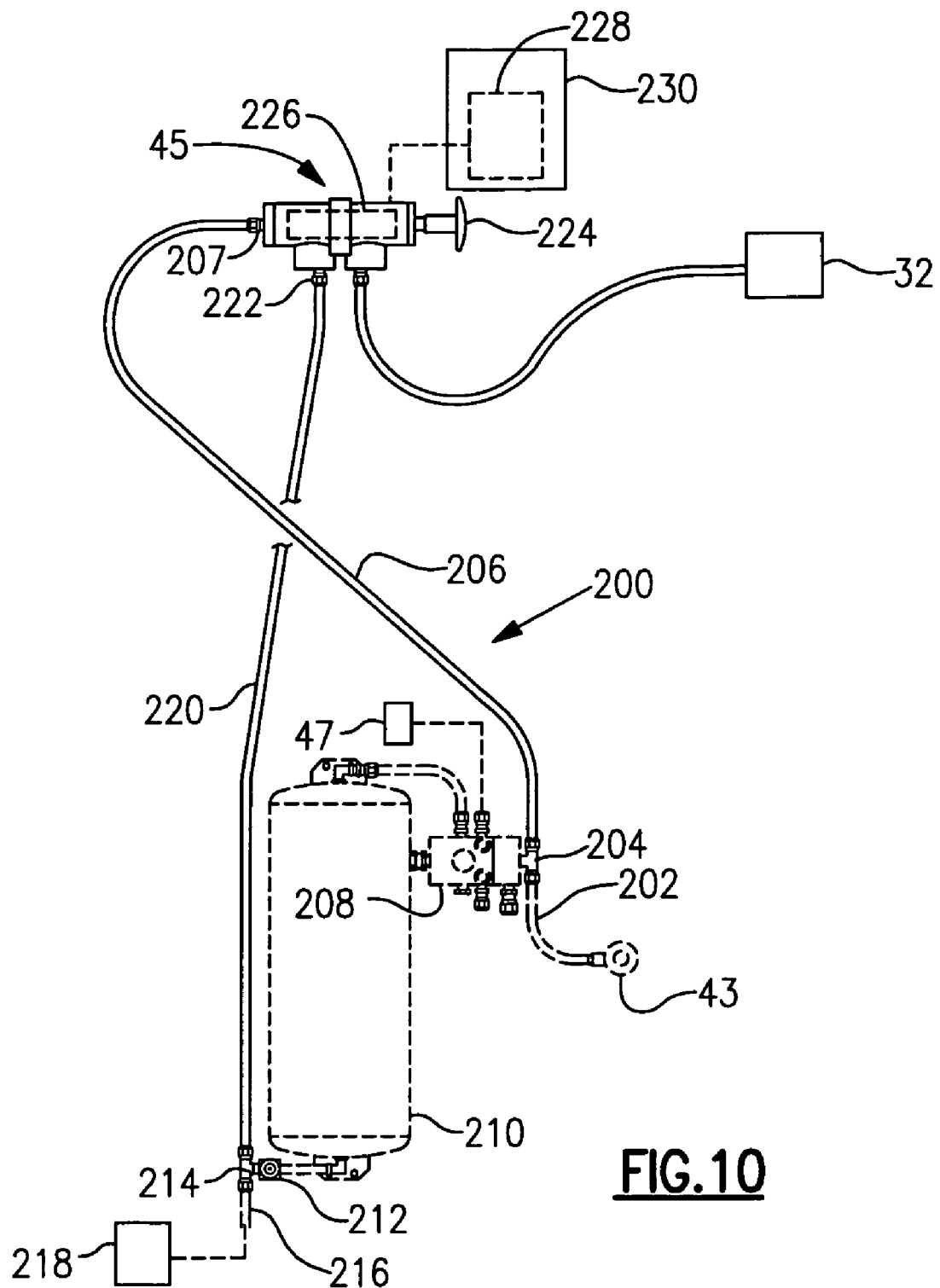
FIG. 10 is a schematic view of a parking brake system incorporating the locking mechanism.

As described briefly above, the control valve 45 is also fluidly connected with a parking brake system 47. FIG. 10 illustrates an example pneumatic system 200 that includes the parking brake system 47. The parking brake system 47 could include either a parking brake priority or a service brake priority, for example. FIG. 10 is an over-simplification, and eliminates the entire service brake plumbing. Additional non-limiting examples of parking brake arrangements are set forth in U.S. Pat. No. 7,097,192 issued to Saieg et al., which is owned by the assignee of the present invention.

The pressurized gas supply 43 selectively communicates pressurized air through supply line 202, which is connected with a T-connection 204 that splits the air flow. A portion flows through pilot port line 206 leading to a rear port 207 of the control valve 45 and another portion to control valve 208. The control valve 208 is connected with an air reservoir 210 and the parking brake system 47. Another control valve 212 connected to the air reservoir 210 feeds pressurized air through another T-connection 214 that splits the flow between an air spring line 216 leading to vehicle air springs 218 and a supply line 220 leading to a supply port 222 of the control valve 45.

In this example, the parking brakes have a default park position such that the vehicle is unable to move and a release position wherein the pressurized gas supply 43 supplies air to lift the parking brakes to permit vehicle movement. In the park position, the air reservoir 210 supplies pressurized air through the supply line 220 to the control valve 45 such that manual actuation of a push-button 224 on the control valve permits pressurized air flow to the pneumatic actuator 32 to retract and unlock the pins 34. However, when an operator sends a signal to release the parking brakes, the pressurized gas supply 43 supplies pressurized air through supply line 202 and through pilot port line 206 to the rear port 207. The air flow into the rear port 207 serves two functions. If the push-button 224 is in a blocking position to block air flow to the pneumatic actuator 32, the air flow into the rear port 207 prevents the push-button from being moved to a flow position that would permit air flow to the pneumatic actuator 32 to unlock the pins 34. If the push-button is already in the flow position when the parking brakes are released, the air flow into the rear port 207 pops the push-button 224 into the blocking position to block the air flow to the pneumatic actuator 32. Thus, the pneumatic system 200 provides the benefit that release of the parking brakes prevents the operator from manually actuating the control valve 45 to unlock the pins 34, and automatically locks the pins 34 if they are unlocked. This also provides the benefit of ensuring that the parking brakes are in the park position before the operator uses the trailer slider system 10 to unlock the pins 34 and reposition the wheels relative to the trailer support structure, and locking the pins 34 if the operator forgets to lock the pins 34 before driving the vehicle.

Alternatively, the control valve 45 includes a solenoid valve 226 instead of the push-button valve 224. The solenoid valve 226 may be connected to a remote controller 228, such within a cab 230 of the vehicle, which communicates with the solenoid valve 226 using the vehicle's anti-lock brake controls.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A trailer slider system including a body rail that slides longitudinally relative to a suspension frame side rail, one of the body rail or the suspension frame side rail including holes that provide multiple suspension positions, the trailer slider system comprising:
    a pin connection assembly having a pin that is arranged to extend into one of said holes in a locked position and retract out of one of said holes in an unlocked position;
    a cam coupled for movement with said pin connection assembly;
    a tube supported by a slider support structure, said tube coupled with said cam to rotate as said pin moves between said locked position and said unlocked position, and wherein said tube extends along a tube axis that is perpendicular to a longitudinal axis defined by said body rail with said tube axis extending in a vertical direction along a length of said tube, said longitudinal axis extending along a length of said body rail, and wherein said pin has a length extending in a lateral direction as defined across a vehicle width; and
    a pneumatic actuator coupled with said tube for selectively rotating said tube to move said cam to move said pin between said locked position and said unlocked position, wherein said pneumatic actuator includes an exhaust state and a pressurized state, with said exhaust state corresponding to said locked position and said pressurized state corresponding to said unlocked position.

2. The trailer slider system according to claim 1, further comprising a pressurized gas supply fluidly connected with said pneumatic actuator.

3. A trailer slider system including a body rail that slides longitudinally relative to a suspension frame side rail, one of the body rail or the suspension frame side rail including holes that provide multiple suspension positions, the trailer slider system comprising:
    a pin connection assembly having a pin that is arranged to extend into one of said holes in a locked position and retract out of one of said holes in an unlocked position;
    a cam coupled for movement with said pin connection assembly;
    a tube supported by a slider support structure, said tube coupled with said cam to rotate as said pin moves between said locked position and said unlocked position, and wherein said tube extends along a tube axis that is non-parallel to a longitudinal axis defined by said body rail;
    a pneumatic actuator coupled with said tube for selectively rotating said tube to move said cam to move said pin between said locked position and said unlocked position, wherein said pneumatic actuator includes an exhaust state and a pressurized state, with said exhaust state corresponding to said locked position and said pressurized state corresponding to said unlocked position;
    a pressurized gas supply fluidly connected with said pneumatic actuator; and
    a control valve fluidly connected between said pneumatic actuator and said pressurized gas supply to selectively control a pressurized gas flow therebetween.

4. The trailer slider system according to claim 3, further comprising a first supply line and a second supply line that each fluidly connect said control valve with said pressurized gas supply.

5. The trailer slider system according to claim 4, wherein said control valve is moveable between an exhaust position corresponding to said locked position and a supply position corresponding to said unlocked position.

6. The trailer slider system according to claim 5, wherein said pressurized gas supply selectively provides said pressurized gas flow through said first supply line to bias said control valve towards said exhaust position responsive to a park position of a parking brake.

7. The trailer slider system according to claim 5, wherein said pressurized gas supply selectively provides said pressurized gas flow through said second supply line such that said control valve transmits said pressurized gas flow to said pneumatic actuator when said control valve is in said supply position to move said pin to said unlocked position.

8. The trailer slider system according to claim 3, wherein said control valve comprises a manually operative valve for selectively venting said pneumatic actuator.

9. A trailer slider system including a body rail that slides longitudinally relative to a suspension frame side rail, one of the body rail or the suspension frame side rail including holes that provide multiple suspension positions, the trailer slider system comprising:
- a pin connection assembly having a pin that is arranged to extend into one of said holes in a locked position and retract out of one of said holes in an unlocked position;
- a cam coupled for movement with said pin connection assembly;
- a tube supported by a slider support structure, said tube coupled with said cam to rotate as said pin moves between said locked position and said unlocked position;
- a pneumatic actuator coupled with said tube for selectively rotating said tube to move said cam to move said pin between said locked position and said unlocked position;
- a pressurized gas supply fluidly connected with said pneumatic actuator;
- a control valve fluidly connected between said pneumatic actuator and said pressurized gas supply to selectively control a pressurized gas flow therebetween; and
- a controller in communication with said control valve for selectively venting said pneumatic actuator.

10. A trailer slider system including a body rail that slides longitudinally relative to a suspension frame side rail, one of the body rail or the suspension frame side rail including holes that provide multiple suspension positions, the trailer slider system comprising:
- a pin connection assembly having a pin that is arranged to extend into one of said holes in a locked position and retract out of one of said holes in an unlocked position wherein said pin includes an end that extends through one of said holes in said locked position, said end having an end surface including at least one ramped portion;
- a cam coupled for movement with said pin connection assembly;
- a tube supported by a slider support structure, said tube coupled with said cam to rotate as said pin moves between said locked position and said unlocked position; and
- a pneumatic actuator coupled with said tube for selectively rotating said tube to move said cam to move said pin between said locked position and said unlocked position.

11. A trailer slider system including a body rail that slides longitudinally relative to a suspension frame side rail, one of the body rail or the suspension frame side rail including holes that provide multiple suspension positions, the trailer slider system comprising:
- a pin connection assembly having a pin that is arranged to extend into one of said holes in a locked position and retract out of one of said holes in an unlocked position wherein said pin includes an end that extends through one of said holes in said locked position, said end having at least one stepped portion;
- a cam coupled for movement with said pin connection assembly;
- a tube supported by a slider support structure, said tube coupled with said cam to rotate as said pin moves between said locked position and said unlocked position; and
- a pneumatic actuator coupled with said tube for selectively rotating said tube to move said cam to move said pin between said locked position and said unlocked position.

12. A trailer slider system including a body rail that slides longitudinally relative to a suspension frame side rail, one of the body rail or the suspension frame side rail including holes that provide multiple suspension positions, the trailer slider system comprising:
- a pin connection assembly having a pin that is arranged to extend into one of said holes in a locked position and retract out of one of said holes in an unlocked position;
- a cam coupled for movement with said pin connection assembly;
- a tube supported by a slider support structure, said tube coupled with said cam to rotate as said pin moves between said locked position and said unlocked position, and wherein said tube extends along a tube axis that is non-parallel to a longitudinal axis defined by said body rail; and
- a pneumatic actuator coupled with said tube for selectively rotating said tube to move said cam to move said pin between said locked position and said unlocked position, wherein said pneumatic actuator includes an exhaust state and a pressurized state, with said exhaust state corresponding to said locked position and said pressurized state corresponding to said unlocked position, and wherein said pneumatic actuator includes a rod pivotally coupled with a lever that is coupled with said tube such that movement of said rod rotates said lever to rotate said tube.

13. The trailer slider system according to claim 12, further comprising a clevis and pin connection that pivotally couples said lever and said rod.

14. A trailer slider system including a body rail that slides longitudinally relative to a suspension frame side rail, one of the body rail or the suspension frame side rail including holes that provide multiple suspension positions, the trailer slider system comprising:
- a pin connection assembly having a pin that is arranged to extend into one of said holes in a locked position and retract out of one of said holes in an unlocked position;
- a cam coupled for movement with said pin connection assembly;
- a tube supported by a slider support structure, said tube coupled with said cam to rotate as said pin moves between said locked position and said unlocked position, and wherein said tube extends along a tube axis that is non-parallel to a longitudinal axis defined by said body rail, and wherein said slider support structure includes a bracket having a bearing surface for rotatably supporting said tube; and
- a pneumatic actuator coupled with said tube for selectively rotating said tube to move said cam to move said pin between said locked position and said unlocked position, wherein said pneumatic actuator includes an exhaust state and a pressurized state, with said exhaust state corresponding to said locked position and said pressurized state corresponding to said unlocked position.

15. A trailer slider system including a body rail that slides longitudinally relative to a suspension frame side rail, one of the body rail or the suspension frame side rail including holes that provide multiple suspension positions, the trailer slider system comprising:
- a pin connection assembly;

a pin associated with said pin connection assembly, said pin is arranged to extend into one of said holes in a locked position and retract out of one of said holes in an unlocked position, said pin including an end that extends through one of said holes in said locked position, said end having an end surface including an end feature selected from at least one ramped portion and at least one stepped portion;

a pneumatic actuator operatively connected with said pin connection assembly for moving said pin between said locked position and said unlocked position;

a pneumatic parking brake to be associated with a trailer carrying said trailer slider; and a pressurized gas supply fluidly connected with said pneumatic actuator and said pneumatic parking brake.

16. A trailer slider system including a body rail that slides longitudinally relative to a suspension frame side rail, one of the body rail or the suspension frame side rail including holes that provide multiple suspension positions, the trailer slider system comprising:

a pin connection assembly having a pin that is arranged to extend into one of said holes in a locked position and retract out of one of said holes in an unlocked position wherein said pin connection assembly includes first and second pins that are laterally opposed from each other;

a cam coupled for movement with said pin connection assembly with said first and said second pins being coupled to said cam with respective first and second laterally extending connection links, and wherein said cam comprises a forward cam that is connected to a rear cam with a longitudinally extending fore-aft connection link;

a tube supported by a slider support structure, said tube coupled with said cam to rotate as said pin moves between said locked position and said unlocked position, and wherein said tube rotates about a vertically extending axis to move said pin in a lateral direction between said locked and said unlocked positions; and a pneumatic actuator coupled with said tube for selectively rotating said tube to move said cam to move said pin between said locked position and said unlocked position.

17. A trailer slider system including a body rail that slides longitudinally relative to a suspension frame side rail, one of the body rail or the suspension frame side rail including holes that provide multiple suspension positions, the trailer slider system comprising:

a pin connection assembly having a pin that is arranged to extend into one of said holes in a locked position and retract out of one of said holes in an unlocked position;

a cam coupled for movement with said pin connection assembly;

a tube supported by a slider support structure, said tube coupled with said cam to rotate as said pin moves between said locked position and said unlocked position, and wherein said tube has a first end rotatably supported within a bracket and a second end rotatably supported by said slider support structure, said cam being fixed to said tube at a position between said first and said second ends; and a pneumatic actuator coupled with said tube for selectively rotating said tube about a vertical axis to move said cam to move said pin between said locked position and said unlocked position.

18. The trailer slider system according to claim 17 wherein said slider support structure comprises a laterally extending cross member.

19. The trailer slider system according to claim 17 wherein said vertical axis extends along a length of said tube, and wherein a longitudinal axis extends along a length of said body rail and a lateral axis extends along a length of said pin, with said vertical axis being perpendicular to said longitudinal and lateral axes.

20. The trailer slider system according to claim 17 wherein said vertical axis is perpendicular to a horizontal ground surface.

* * * * *